(12) United States Patent
Saunders et al.

(10) Patent No.: US 6,847,681 B2
(45) Date of Patent: Jan. 25, 2005

(54) DATA PROCESSING SYSTEM AND METHOD OF DATA PROCESSING

(75) Inventors: Nicholas Ian Saunders, Basingstoke (GB); James Hedley Wilkinson, Tadley (GB)

(73) Assignee: Sony United Kingdom Limited, Weybridge (GB)

( * ) Notice: Subject to any disclaimer, the term of this patent is extended or adjusted under 35 U.S.C. 154(b) by 719 days.

(21) Appl. No.: 09/766,263

(22) Filed: Jan. 18, 2001

(65) Prior Publication Data

US 2001/0017593 A1 Aug. 30, 2001

(30) Foreign Application Priority Data

Jan. 21, 2000 (GB) .............................................. 0001469

(51) Int. Cl.[7] .............................................. H04N 7/12
(52) U.S. Cl. ................ 375/240.03; 382/236; 348/390.1
(58) Field of Search ....................... 375/240.03, 240.12, 375/240.26, 240.16; 382/236, 239, 248; 348/390.1, 419.1, 402.1; 345/735

(56) References Cited

U.S. PATENT DOCUMENTS

| | | | | |
|---|---|---|---|---|
| 5,907,374 A | * | 5/1999 | Liu ........................ | 375/240.26 |
| 6,310,915 B1 | * | 10/2001 | Wells et al. ............ | 375/240.03 |
| 6,483,543 B1 | * | 11/2002 | Zhang et al. ............ | 348/390.1 |
| 6,563,517 B1 | * | 5/2003 | Bhagwat et al. ............. | 345/735 |

FOREIGN PATENT DOCUMENTS

| | | |
|---|---|---|
| EP | 0 584 741 | 3/1994 |
| GB | 2 333 656 | 7/1999 |
| GB | 2 333 657 | 7/1999 |
| WO | WO 94/24809 | 10/1994 |
| WO | WO 95/35628 | 12/1995 |

OTHER PUBLICATIONS

"Seamless Concatenation—A 21st Century Dream" by Mike Knee , et al., pp. 1–16.

* cited by examiner

Primary Examiner—Gims Philippe
(74) Attorney, Agent, or Firm—Frommer Lawrence & Haug LLP; William S. Frommer

(57) ABSTRACT

A data processing system comprises a data compression decoder arranged in operation to decode first and second encoded data to produce first and second uncompressed data representative of first and second source data from which the first and second encoded data were produced in accordance with a compression encoding algorithm respectively. The data compression decoder also produces first and second compression parameter data representative of encoding decisions made by the compression encoding algorithm when the first and second source data was compression encoded. The data processing system also comprises a data compression encoder which is arranged in operation to compression encode the uncompressed data in accordance with the compression encoding algorithm using the first and/or the second compression parameter data, and a data communications apparatus coupled to the data compression decoder and the data compression encoder and arranged in operation to communicate the first and/or the second uncompressed data and the first and/or the second parameter data, wherein the first and second uncompressed data and the first and/or the second parameter data are separately communicated via a common communications channel provided by the data communications apparatus. The compression encoding algorithm may be an MPEG-type algorithm, such as MPEG-2. The data processing system provides an advantageous alternative to the MOLE (TM).

34 Claims, 6 Drawing Sheets

DATA PROCESSING SYSTEM AND METHOD OF DATA PROCESSING

BACKGROUND OF THE INVENTION

1. Field of Invention

The present invention relates to data processing systems and methods of processing data. More particularly, the present invention relates to data processing systems which include a data compression encoder and a data compression decoder and methods of processing data which include data compression encoding and decoding.

2. Description of the Prior Art

Data compression encoding is a process which compresses source data into a smaller amount of data representing the information. Typically, data compression encoders operate in accordance with an algorithm to convert the source data into compression encoded data which is typically a much smaller amount of data than the original source data. An example of a compression encoding process is the "WINZIP" application which is used on conventional personal computers to reduce an amount of data which represents a data file. The "WINZIP" application allows a data file to be compression encoded to produce a compressed data file. The compressed data file may therefore be represented for example as a much smaller amount of information on a disc or represented on a smaller number of discs, or communicated via electronic mail which may allow only data files of a limited size.

Another example of compression encoding is compression encoding of video signals represented in digital form in order to substantially reduce an amount of data, or correspondingly a rate of communicating the data which is required to represent the video signals. One example of such video compression encoding algorithms is the Motion Picture Expert Group (MPEG)-type algorithms, and more particularly the MPEG 2 algorithm. The MPEG 2 algorithm is an example of a compression encoding algorithm in which the encoder employs several encoding techniques to compress the amount of data required to represent the video signal. One of these encoding techniques involves dividing the pictures of the video signal into Groups of Pictures (GOPs). At least one of the pictures of the GOP is then divided into smaller groups of pixels known as macro blocks, and a Discrete Cosine Transform (DCT) is applied to the pixels of the macro-blocks. A related coding step involves reducing a level of quantization applied to the coefficients which represent the DCT transformed macro-block in order to reduce an amount of information required to represent the picture in the transform domain without noticeably affecting the image when reproduced by a decoder. Other steps take advantage of spatial and temporal redundancy within the pictures of the GOP in order to send only data representative of changes in the pictures of the GOP from one picture to another. These processing techniques have an advantage of compression encoding the video signals thereby substantially reducing the amount of information required to represent the video signals.

It is often desirable to process the video signal information which is represented in compressed form. Data processing systems, which are arranged to process the information, are therefore provided with a data compression decoder and a data compression encoder. Typically such data processing systems are also provided with a data processor which operates to process the information after the decoder has returned the information into the uncompressed or "base band" form so that the desired processing operations can be performed. Examples of such processing operations performed on compressed video signals are splicing or combining two video signals to produce a composite video signal representative of a mix of two images such as, for example, when a logo is superimposed on a video image. However, when the uncompressed data is recompressed by applying the data compression encoder, an improvement is often provided to the process of data compression re-encoding if parameters or coding decisions which were used in the data compression encoder originally applied to the source data are reused or provided in order to guide the data compression encoder. The encoder uses the parameters, which may represent coding decisions, to re-compression encode the data so that the information which is represented by the uncompressed data is more accurately retained in the recompressed data produced when the data compression encoder is applied to the uncompressed data.

From the aforementioned example of processing video signals, reusing the DCT type and the quantization levels applied to the DCT encoded source data by the compression encoder has an effect of retaining the quality of the video signals when the recompression encoded signal is decompressed and displayed. This is because the data compression re-encoder can match the way in which redundant information is discarded when source data was originally encoded. However, the parameters, which were used in the data compression encoder must be conveyed some how within the data processing system from the data compression decoder to the data compression encoder.

A known technique for conveying the data compression encoding parameters produced from an MPEG 2 type data compression encoder within an uncompressed video signal is known as the MOLE (TM). The MOLE (TM) is described in, for example, a disclosure entitled "Seamless Concatenation—a $21^{st}$ Century Dream" by M. J. Knee and N. D. Wells, published in a journal entitled "Atlantic Technical Papers"1996–1997 under the Acts AC078 project. It is further specified in a disclosure entitled "Initial Proposal for Video MOLE Standardisation" Essentially, the MOLE provides a technique in which the data compression encoding parameters are incorporated in the least significant bits of the signal samples of the uncompressed video signals as part of the uncompressed data. However, the MOLE is known to have a number of disadvantages. For example, if any processing is performed on the uncompressed data such as, for example, applying a cross fade, the code parameters present within the MOLE will be automatically destroyed and therefore cannot be used for the encoding.

SUMMARY OF THE INVENTION

According to the present invention, there is provided a data processing system, comprising a data compression decoder arranged in operation to decode first encoded data to produce first uncompressed data, the first uncompressed data being representative of first source data from which the first encoded data was produced in accordance with a compression encoding algorithm, the data compression decoder also producing first compression parameter data representative of decisions made by the compression encoding algorithm when the first source data was compression encoded, a communications processor operable to store the first parameter data in a data store, and to communicate the first uncompressed data, second uncompressed data, and the first parameter data on request via a data communications apparatus to one of a data processor or a data compression encoder, the data compression encoder being operable to compression encode a combination of the first and second uncompressed data in accordance with the compression encoding algorithm using the first parameter data. wherein the data communications apparatus is operable to communicate the first and second uncompressed data, and the first parameter data separately via a communications channel provided by the data communications apparatus.

As indicated above, one disadvantage of the MOLE is that if any processing is performed on the uncompressed data then the code parameters represented as parameter data communicated with the uncompressed data can be destroyed. Therefore, an improvement is provided to a data processing system which processes data received in a compression encoded state and which is uncompressed and processed and then recompression encoded. By arranging for parameter data representative of the compression encoding parameters to be communicated separately from the uncompressed data, a data processor can be arranged to process the uncompressed data whilst passing the parameter data unaffected to an output of the data processor. Therefore, the data processing system may include at least one data processor coupled to the communications apparatus, which is arranged in operation to process the uncompressed data to produce processed data adapted from the uncompressed data. The processed data is communicated via the communications apparatus and the data compression encoder is arranged in operation to compression encode either the uncompressed data or the processed data using the first parameter data.

Although the second uncompressed data may be generated from an uncompressed (base band) data source which has not been compression encoded, in some embodiments, the second uncompressed data is generated by the data compression decoder from second encoded data, the data compression decoder also producing second compression parameter data representative of decisions made by the compression encoding algorithm when the second source data was compression encoded, the communications processor being operable to store the second parameter data in the data store and to communicate the second parameter data on request to one of said data processor or said data compression encoder.

A further improvement is provided to the data processing system, which is arranged to communicate the first and second parameter data separately from the first and second uncompressed data. The data compression re-encoder may operate to recompression encode using if necessary both the first and the second parameter data, which represent the encoding decisions which were used when the first and second source data were compression encoded respectively. Providing most and preferably all of the encoding decisions which were used when the first and second source data were compression encoded, provides the compression encoder, when re-compression encoding data formed from a combination of the first and the second uncompressed data with both the first and second parameter data for any part of the combination of the first and second uncompressed data being re-compression encoded. As such, in preferred embodiments the first and second parameter data provide the encoding decisions which were used when all of said first and second source data were compression encoded to produce the first and second compression encoded data.

Advantageously therefore, in preferred embodiments, the first and second parameter data is available for the entire set of the first and second uncompressed data, independently of processes performed on the uncompressed data. Therefore, by separating the parameter data from the uncompressed data when the compressed data is compression decoded, the parameter data may be used separately from and distinct from the uncompressed data. The uncompressed data is known within the broadcast technical field as 'base band' data.

A further improvement is provided by storing the parameter data produced by the decoder. This is because for communications systems such as the MOLE, the parameter data must be passed contemporaneously with the uncompressed data. However, because the uncompressed data may be processed and adapted further by the data processing system, the compression encoding parameters may not always be required by the data compression re-encoder. Furthermore, for the example in which the uncompressed data represent video signals, the processed video signals may comprise a combination of video images, and the data compression encoder may not know which parameter data is required from which uncompressed data source until compression re-encoding is performed. As such, storing the first and second parameter data in a data store provides an advantage in that the data compression re-encoder or any other data processor may selectively retrieve the compression parameter data to be applied and used at a time which is different to that when the uncompressed data with which they are associated is processed. That is to say, that although the parameter data is retrieved and is present at a point in the processing when the video signals are recompression encoded, until then, the uncompressed video signals may be processed independently of the coding parameters.

The parameter data may be communicated on the communications channel in a temporal period which is separate from a period when the uncompressed data is communicated. Therefore, by separating the parameter data and the uncompressed data in time, a data processor or the compression re-encoder may readily separate the parameter data from the uncompressed data.

The temporal period in which the parameter data are communicated may be a period of inactivity of the uncompressed data with respect to time.

An improvement in the efficiency with which the compression parameters are communicated is provided through utilising efficiently an available band width of the communications channel by communicating the parameter data at a time when the uncompressed data includes periods of inactivity. The uncompressed data may be representative of video signals and the periods of inactivity in which the parameter data are communicated may be blanking periods between fields of the video signal. Therefore, in preferred embodiments in which the uncompressed data are video signals, there occurs a blanking period which is generated with conventional video signals between fields of the video signals, and it is in this blanking period which the parameter data are communicated. The blanking period between fields may be formed as part of an H-ancillary space of a Serial Digital Interface (SDI) or Serial Data Transport Interface (SDTI) packet, the compressed data being communicated in the pay load of the packet.

SDI is a known standard which provides a means for communicating video signals and the like between items of audio and video equipment. SDTI is a related standard interface format for streaming video, audio and data around a data processing system such as a broadcast studio or production studio. Therefore, in preferred embodiments, the communications apparatus may operate in accordance with the SDI standard or the SDTI standard, so that the parameter data is transported in the H ancillary space of the SDI packet or a SDTI packet. Furthermore, the periods of inactivity, may include header information giving an address associated with one of the at least one data processing apparatus, the decoder and the encoder, the communications apparatus being arranged in operation to communicate the parameter data to the associated address.

In order to provide a facility for communicating the parameter data to any of the data processors or the data compression encoders forming part of the data processing system, the communications apparatus may be provided with a router which operates to identify the address from the header information, to determine which of the plurality of data processors, the encoder and decoder the address is associated and to communicate the parameter data to the associated address.

In preferred embodiments, the data processor may be arranged in operation to receive the first and second parameter data, to store the first and second parameter data in the data store and to communicate the parameter data on request to one of the data processors and the encoder. Furthermore, one of the at least one data processors and the encoder may be arranged in operation to communicate to the data store a request to receive the parameter data, to provide a return address to which the parameter data is to be sent, and the communications processor may be arranged in operation to retrieve the parameter data from the data store and to communicate using the communications apparatus the parameter data to the return address.

Further aspects and features of the present invention are defined in the appended claims.

BRIEF DESCRIPTION OF THE DRAWINGS

Embodiments of the present invention will now be described by way of example with reference to the accompanying drawings in which.

DESCRIPTION OF PREFERRED EMBODIMENTS

Figure 1:
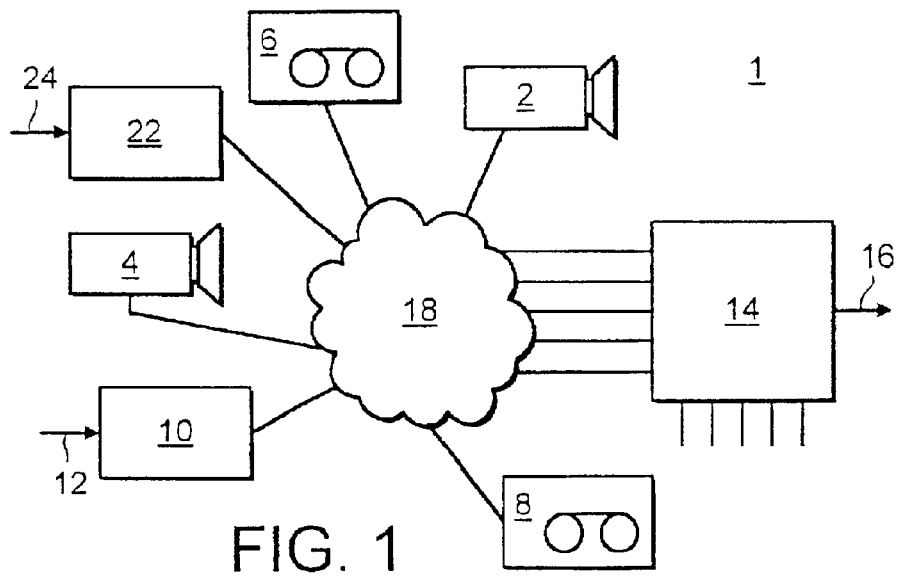
FIG. 1 is a schematic block diagram of a broadcasting or television production studio.

In order to illustrate the advantages provided by embodiments of the present invention, and to facilitate understanding, example embodiments of the present invention will be described with reference to a television production studio. An illustrative diagram of a television production studio 1 is shown in FIG. 1. As is typical of conventional broadcast and television production studios, the television production studio 1 shown in FIG. 1 includes video cameras 2, 4, and video tape recorders 6, 8. Although conventional television production studios are known to mix and combine video signals as well as audio signals in order to generate a television production using analogue signals, there is an increasing requirement to process video and audio signals in digital form. To this end the video cameras 2, 4 and the video tape recorders 6, 8 of the example television studio shown in FIG. 1, operate to generate digital signal samples representative of video and/or audio signals. Furthermore, there is an increasing requirement for such television production studios to operate to process video and/or audio signals, which are represented and provided in a compressed form. An example of such a compressed form is where video and audio signals have been data compression encoded, using for example an MPEG type compression encoding algorithm, such as MPEG 2. For this reason, the television production studio shown in FIG. 1 also includes data compression decoders 10, 22 which operate to data compression decode MPEG 2 signals received from input channel 12, 24.

The television production studio 1 is arranged in operation to combine the video signals from either of the television cameras 2, 4, the video tape recorders 6, 8, or video signals represented as uncompressed data or base band data produced by the data compression decoders 10, 22. These various video signals are combined by a digital video effects processor 14, to produce a television production at an output channel 16. However, in order to communicate signals from each of the items of equipment forming the television production studio, a data communications network 18 is provided to connect each of the items of equipment to the digital video effects processor 14 via respective input channels 20 and to each other. As will be appreciated from the description of the television studio shown in FIG. 1, there is a requirement to interconnect various items of audio and video equipment such as the television cameras 2, 4, the video tape recorders 6, 8, and the compression decoders 12, 22. A further requirement of the television production studio will now be explained with reference to FIG. 2 where parts common to FIG. 1 bear the same numerical designations.

Figure 2:
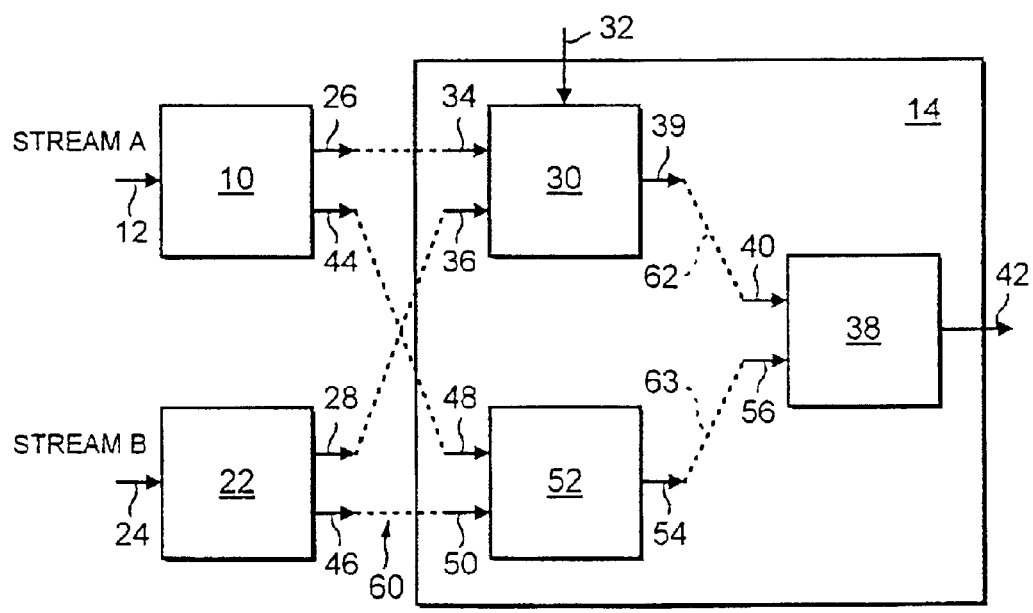
FIG. 2 is a schematic block diagram showing an arrangement in which two compressed video data streams are combined.

FIG. 2 provides a block diagram illustrating a process in which two video signals in a compressed form STREAM A, STREAM B are combined and re-encoded. FIG. 2 provides an illustration of apparatus which may form part of the digital video effects processor 14 shown in FIG. 1. In FIG. 2, the first data compression decoder 10 is arranged to receive a compressed MPEG video stream through the input channel 12. The second data compression decoder 22 is shown to receive a second MPEG encoded video bit stream STREAM B through the second input channel 24. The first and second data compression decoders 10, 22 operate to convert the MPEG encoded video streams into base band or uncompressed video data which are presented at an output channel of each of the first and second decoders 26, 28. Each of the first and second uncompressed video data streams is then fed respectively to first and second input channels of a video switch 30. The video switch 30 also receives an input signal from an input channel 32 and operates to concatenate or stream together the first and second video bit streams STREAM A, STREAM B received on the first and second video stream input channels 34, 36. The resulting spliced or concatenated video data stream is fed from an output channel 39, of the video switch 30 to a first input 38 of a data compression encoder 38. The data compression encoder 38 receives the processed video bit stream at the first input channel 40 and operates to recompression encode the processed video bit stream to produce at an output channel 42 an MPEG encoded version of the processed bit stream.

As shown in FIG. 2, the first and second data compression decoders 10, 22 are also provided with a second output channel 44, 46. At each of the second output channels 44, 46, the data compression decoders 10, 22 provide compression parameter data representative of parameter values corresponding to coding decisions which were taken and used by the compression encoder which produced the first and second bit streams STREAM A, STREAM B. The parameter values of the compression encoded streams STREAM A, STREAM B are then fed respectively to first and second input channels 48, 50 of a compression parameter combiner 52. The parameter combiner 52 operates to combine the compression parameter data from the first and second compression decoders 10, 22 to produce at an output channel 54 a combined stream of compression parameter data. The combined compression parameter data are then fed to a second input channel 56 of the data compression encoder 38 and are used in the process of recompression encoding the concatenated video bit stream as will be explained in the following paragraphs.

The apparatus shown in FIG. 2 which forms part of the digital video effects processor 14 operates, as explained in the above mentioned article entitled "Seamless Concatenation—a 21$^{st}$ Century Dream", to reduce impairments introduced into the video data stream by concatenating an MPEG decoder and MPEG encoder. The reduction in the impairments is effected by providing the data compression encoder 38 with the encoding decisions which were used to encode the first and second MPEG encoded video stream STREAM A, STREAM B. These coding decisions which correspond to parameter data values of the encoder include such parameters as the quantization levels used for the DCT coefficients as well as the DCT type and other such parameters like motion vector values. Other examples of compression parameter data are disclosed in the article entitled "Initial Proposal for Video MOLE Standardisation". Simply expressed by providing the compression encoded parameter values to the re-encoder, the data compression encoder 38 will discard redundant information from the concatenated bit stream in the same way as when the first and second MPEG encoded bit streams STREAM A, STREAM B were encoded. Necessarily, therefore, the compression parameter values which are required by the data compression encoder will be different in dependence upon which part of the concatenated video stream are associated with the video stream A and video stream B.

As explained in the article entitled "Seamless Concatenation—A 21$^{st}$ Century Dream" a known technique for conveying the compression parameter data with the uncompressed video bit stream is to superimpose the parameter data on the least significant bits of the signal samples of the uncompressed data. This is known as the MOLE, and requires that the signal samples of the uncompressed data be represented as 10-bit words rather than 8-bit words. Therefore, the MOLE can be said to apply a restriction on the quantization level and word length of the samples of the video bit stream which can be a disadvantage.

As represented in FIG. 2, the first and second uncompressed video bit streams STREAM A, STREAM B must be conveyed to the video switch 30 whereas the first and second compression parameter data from the first and second compression decoders 10, 22 must be conveyed to the compression parameter combiner 52. As illustrated in FIG. 1, the first and second data compression decoders may be remotely located within the television production studio 1. As such, the video bit streams and compression parameter data must be communicated to the desired destination. This is shown by the dashed lines 60 which are representative of functions performed by the communications network 18. Similarly, the concatenated video bit stream from the output channel 39 of the video switch and the combined parameter data at the output of the compression parameter combiner 52 must be conveyed to the data compression encoder 38 which may be also remotely located within the television production studio. Correspondingly, therefore, the concatenated bit stream and the combined compression parameter data are represented as dash lines 62, 63. As will be appreciated from the foregoing discussions, and for other reasons which will be explained shortly, there is a requirement for a data communications apparatus which communicates the compression parameter data around the television production studio, which does not suffer the disadvantages of the MOLE.

Figure 3:
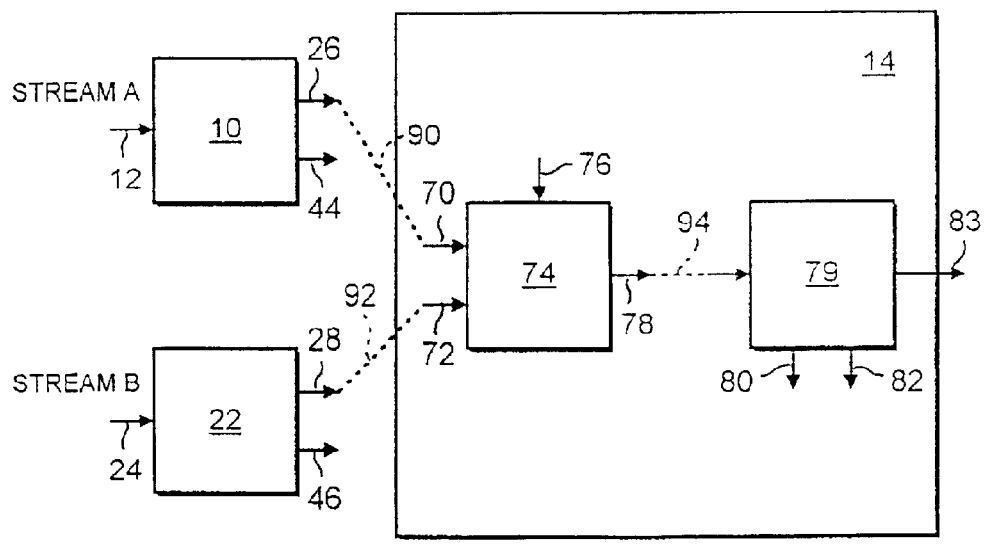
FIG. 3 is a schematic block diagram in which two compressed data streams are formed into a keyed video bit stream and re-encoded.

A further advantage provided by not using the MOLE is illustrated by apparatus also forming part of the digital video effects processor 14 which is shown in FIG. 3 where parts also appearing in FIGS. 1 and 2 bear the same numerical designations. As in FIG. 2, the first and second data compression decoders 10 and 22 are shown to generate an uncompressed versions of MPEG 2 encoded video bit streams STREAM A, STREAM B received on the respective input channels 12, 24. The output channels 26, 28 from the respective first and second data compression decoders 10, 22 are arranged to feed first and second inputs respectively 70, 72 of a logo insertion processor 74 which may form part of the digital video effects processor 14. The logo insertion processor 74 operates to replace or superimpose parts of the second bit stream STREAM B on a video image represented by the first uncompressed video bit stream STREAM A in accordance with a keying signal received at a control input channel 76. The operation of the logo insertion processor 74 is disclosed in our co-pending UK patent application serial number 9920930.6, and is incorporated herein by reference. However, in order to avoid reproducing what is already disclosed in our co-pending UK patent application, it will suffice for the present explanation to say that the logo insertion process 74 operates to generate a video bit stream at an output channel 78 which is produced by combining the video images represented as the first and second bit streams STREAM A, STREAM B under control of the keying signal applied to the control input 76. As with the example shown in FIG. 2, the combined bit stream is then data compression encoded by the encoder 79. However, the data compression encoder 79 differs from the data compression encoder 38 shown in FIG. 2, in that the encoder shown in FIG. 3 is provided with two input channels 80, 82. The first input channel 80 is arranged to receive the compression parameter data from the output channel 44 of the first data compression decoder, whereas the second input channel 82 is arranged to receive compression parameter data from the corresponding output channel 46 of the second data compression decoder 22. As disclosed in our UK patent application number 9920930.6, the data compression encoder 79 will use the code parameters associated originally with the first bit stream STREAM A received on the first input channel 80 to re-encode those parts of the video image represented in the combined video stream associated with the first bit stream. The data compression encoder 79 will use the code parameter data from the second data decoder when encoding parts which are contributed from the second video bit stream STREAM B. However, where a logo has been inserted or where the video images, represented by the first and second bit streams STREAM A, STREAM B, overlap then it is necessary to encode this part of the resulting image in accordance with code parameter data corresponding to the background part of the image in dependence upon how much of the background is present in relation to the foreground of the resulting image. As a result, both the code parameter data from the first and the second data compression decoders are required in order to re-encode the data. In this way, the encoding of the resulting video bit stream can be optimised by reducing losses associated with cascading MPEG decoders and encoders. It can be appreciated that it would be difficult to provide both the compression parameter data from the first and the second compression decoders using the MOLE, since the combined video bit stream could only have one of the compression parameter data or the other and typically not both, because one or the other is selected after combining.

As shown in FIG. 3, the channels connecting the first and second logo insertion processor 74 are illustrated by dash lines 90, 92. Furthermore, although the logo insertion processes 74 and the data compression encoder 79 are shown to be within the digital video effects processor 14, they could be arranged separately and remote from one another. As such, the channel connecting the output of the logo insertion processor 78 to the input of the data compression encoder is shown as a dashed line 94. Therefore, as with the bit stream concatenation arrangement shown in FIG. 2, the communications network 18 must be provided to communicate data conveyed by the connecting channels 90, 92, 94. Furthermore, as shown in FIG. 3, the compression parameter data presented at the output channels 44, 46 of the data compression decoders 10, 22 must be communicated to the first and second inputs of the data compression encoder 79. As already explained a further disadvantage of the MOLE is that the data compression re-encoder may require the data compression parameter data for both the first and second uncompressed video bit streams STREAM A, STREAM B which may not be readily effect using MOLE. However, as mentioned above, the data compression re-encoder may require both the data compression parameters from both the first and second bit streams STREAM A, STREAM B. This is because for example, when performing logo insertion it may be necessary to use the data compression parameters from STREAM A or STREAM B in dependence upon the relative quality of that part of the combined video image. Where a high quality is required then re-encoding is performed using the original coding decisions for that part of the image, depending on whether STREAM A or STREAM B is dominant.

Figure 4:
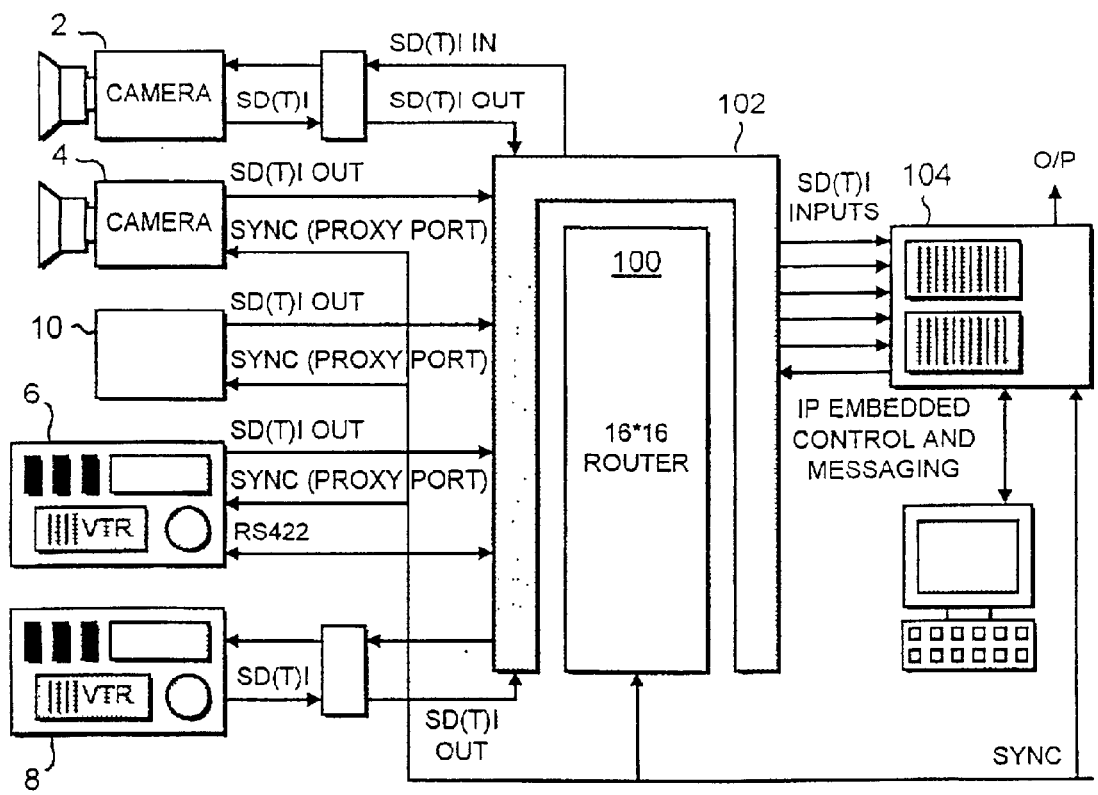
FIG. 4 is a schematic block diagram of the television production studio shown in FIG. 1 with a data communications apparatus shown in more detail.

A data communications network which provides a facility for communicating uncompressed or base band video as well as the compression parameter data is shown in FIG. 4 where parts also appearing in FIGS. 1, 2, and 3 bear the same numerical designations. FIG. 4 provides an illustration of an example embodiment of the present invention in which the data communications network of the television production studio 1 shown in FIG. 1 is provided by a Serial Digital Interface (SDI) or a variation which is shown as the Serial Data Transport Interface (SDTI). As shown in FIG. 4, the television cameras 2, 4, the video tape recorders 6, 8 are connected along with the data compression decoders 10, 22 via an interface conforming to the SDI or SDTI standards. The SDTI communications network comprises a communications router 100 and an embedder/de-embedder unit 102. Also forming part of the SDTI communications network is a control processor 104 which is coupled to the embedder/de-embedder 102. As explained in our co-pending UK patent application serial number 9926323.8, video, audio and data are streamed around the television studio in accordance with the SDI or SDTI standard. The example embodiment will be explained with reference to the SDTI standard. A full explanation is provided in our co-pending UK patent application number 9926323.8 in which data is transported as Internet Protocol packets. However only those details relevant to the present example embodiment will be repeated here.

Figure 5:
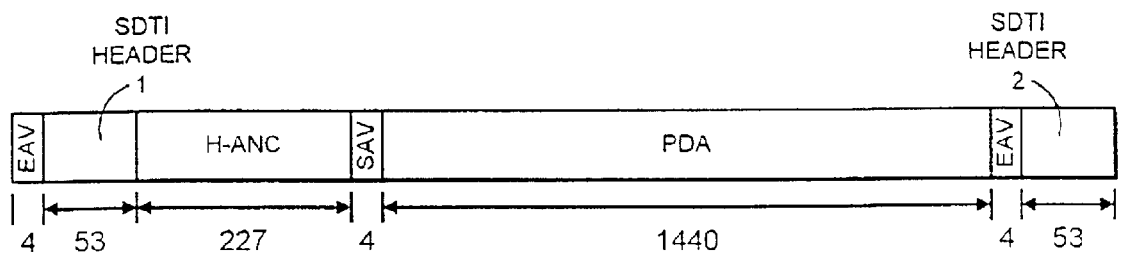
FIG. 5 is a schematic representation of an SDI/SDTI packet.

The SDTI communications format provides a packet structure based on a video centric infrastructure. The packets are equal to the lines of a video scan. As such, an H blanking space is provided, and this is used for a packet header. An active line area is used for streaming the pay load data, which is the video uncompressed data of the present example embodiment. An illustration of the format of the SDTI packet is illustrated in FIG. 5. In FIG. 5, the payload data area corresponding to an active video line of 625 lines is shown as area PDA. To header areas SDTI head 1, SDTI head 2, are provided for header information to facilitate routing and delivering SDTI packet information to the correct address. Also provided in the SDTI packet is the H ancillary space H-ANC. In our co-pending UK patent application number 9926323.8 it is proposed to utilise the H ancillary space H-ANC to communicate intellect protocol packets. However, in accordance with the example embodiment of the present invention, the H ancillary space H-ANC is arranged to communicate the code parameter data from the data compression decoder which has produced the uncompressed data which is written into the payload data area PDA. As indicated in our co-pending UK patent application, although SDTI has been established for a one way or point to point connection by providing the control processor 104 in combination with the embedder/de-embedder 102 and the data router 100, a full duplex network is provided in which ancillary data as well as the pay load data from the video bit stream can be communicated to any piece of equipment which is connected to the embedder/de-embedder 102. To this end, the SDTI headers SDTI head 1, SDTI head 2 are provided with an address of the item of communications equipment to which the ancillary data or the video data may be communicated. The router 100 is an intelligent router which operates to determine the destination of the data within the H ancillary space and to provide an appropriate feedback path to effect delivery of this data to the desired destination. The destination is indicated by the address within the H ancillary space H-ANC.

The television studio shown in FIG. 4 is therefore provided with a facility for routing the video data and the compression parameter data using the SDTI network to a destination address where they are required. However, a time when the compression parameter data are required by the data compression re-encoder may not be known at the time at which they are generated. That is to say, there is a further requirement for providing a flexible arrangement in which the data compression encoder can request data compression parameters associated with a particular base band bit stream when these are required. Such an arrangement is illustrated in FIG. 5 in which parts also appearing in FIGS. 1, 2 and 3 bear the same numerical designations.

Figure 6:
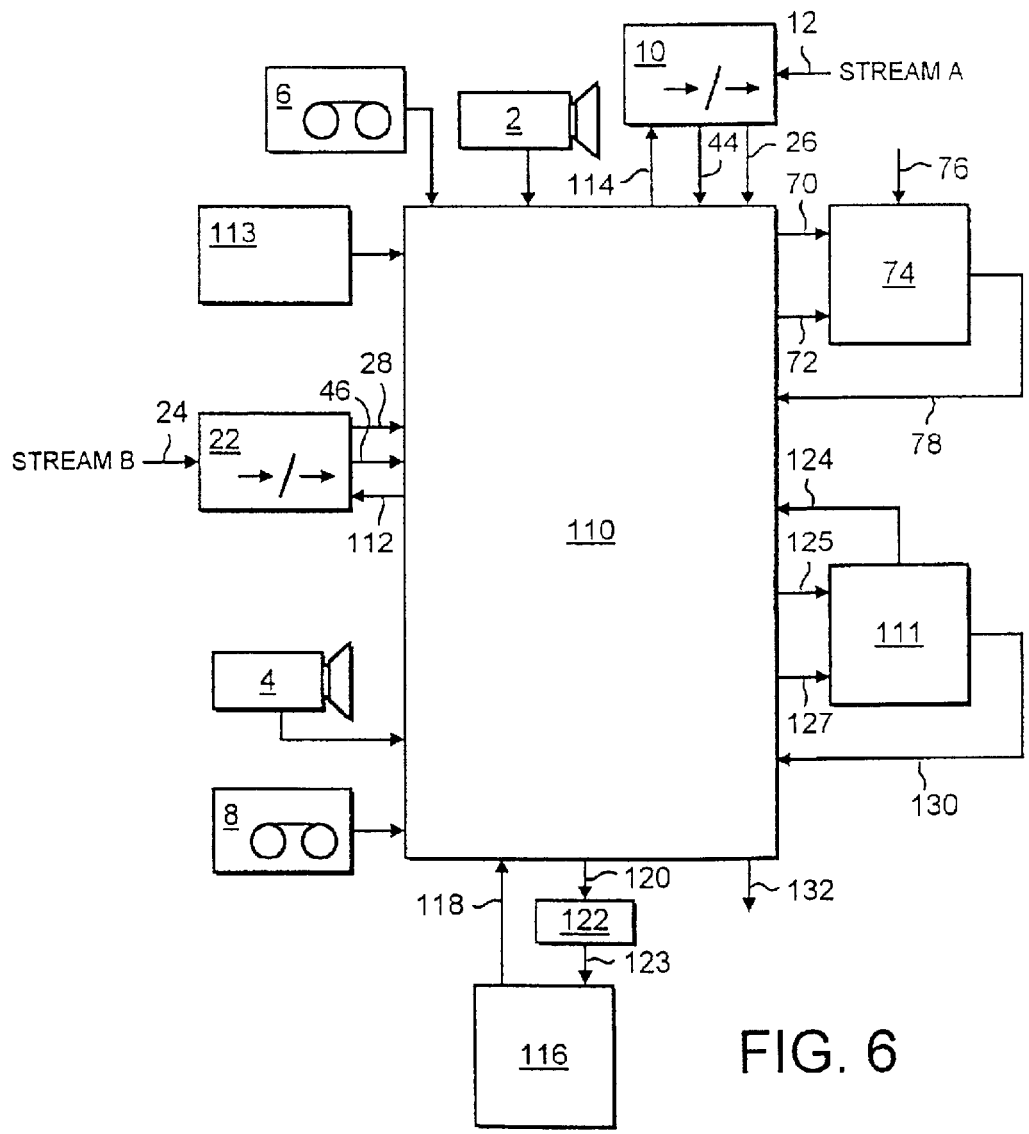
FIG. 6 is a schematic block diagram of the television studio shown in FIG. 1 illustrating an example embodiment of the present invention.

In FIG. 6, the router 100, the embedder/de-embedder 102 and the control processor 104 are represented as a combined SDTI communications network 110. As with FIG. 1, the television production studio shown in FIG. 6 is provided with television cameras 2, 4, and the video tape recorders 6, 8. Also connected to the SDTI communication network 110 is a first data compression decoder 10 and a second data compression decoder 22. Furthermore, a data compression encoder 111 which provides a facility for re-encoding uncompressed video signals is connected to the SDTI communications network 110 as well as a data processor which may be, for example, a logo insertion processor 74 as well as another data processor 113. The SDTI communications network 110 operates as already explained with reference to FIG. 4. As with the arrangements depicted in FIGS. 2 and 3 and already explained, the first and second data compression decoders are arranged to decode first and second MPEG encoded video bit streams STREAM A, STREAM B received on input channels 12, 24. The first output channels 26, 28 of each of the data compression decoders 10, 22 present uncompressed versions of the first and second bit streams STREAM A, STREAM B as well as first and second compression parameter data on the second output channels 44, 46. In accordance with the example embodiment of the invention shown in FIG. 6, each of the data compression decoders 10, 22 also receives control information via control input channels 112, 114. Also included in the television production studio is a data store or data repository 116 which has a first output channel 118 connected to the SDTI communications network 110. A return channel 120 from the SDTI communications network 10 feeds control messages to a local communications processor 122. An output from the local communications processor 122 is coupled to an input 123 to the data repository 116. The operation of the embodiment of the invention illustrated in FIG. 6 will now be described in the following paragraphs.

The logo insertion processor 74 operates as already explained with reference to FIG. 3 to combine uncompressed video streams from the first and the second data compression decoders 10, 22 to produce at an output 78 a combined, uncompressed base band video signal. The SDTI communications network communicates the uncompressed data representative of these first and second video data streams STREAM A, STREAM B from the outputs 26, 28 of the data compression decoders 10, 22 to respective first and second inputs 70, 72 of the logo insertion processor 74. The compression parameter data generated by the first and second decoders is also fed to the output channels 44, 46 to the SDTI communications network 110. The STDI communications network is arranged in operation to communicate the compression parameter data to the data repository 116. Thus the first and second data decoders operate to address the compression parameter data to the address of the communications processor 122 via the SDTI communications network 110. When the compression parameter data are received by the local communications processor 122 via the connecting channel 120, the communications processor 122 operates to store the compression parameter data in the data repository 116.

As already explained, in operation, the data compression re-encoder may now determine whether the compression parameter data from the first or the second bit streams STREAM A or STREAM B are required in order to re-encode the combined video bit stream received at the input 125. Accordingly, the data compression encoder 111 operates to generate a retrieval message which is fed via the SDTI communications network 110 from a connecting channel 124 which is addressed to the local communications processor 122 of the data repository 116. In response to the retrieval message, the local communications processor 122 is arranged in operation to retrieve the compression parameter data for the first bit stream STREAM A and the second bit stream STREAM B and communicate the compression parameter data to an address port of the data compression encoder 116 as specified in the retrieval message. Therefore the data compression encoder is provided at the input channel 127 with the code parameter data necessary for re-encoding the signal. The re-compressed combined video bit stream is then presented at an output channel 130, which also coupled to the SDTI communications network. Therefore by addressing the combined compressed video bit stream output from the compression encoder 111 to an output port 132 of the SDTI communications network the combined video signal may be communicated or stored by a further processor (not shown).

Figure 7:
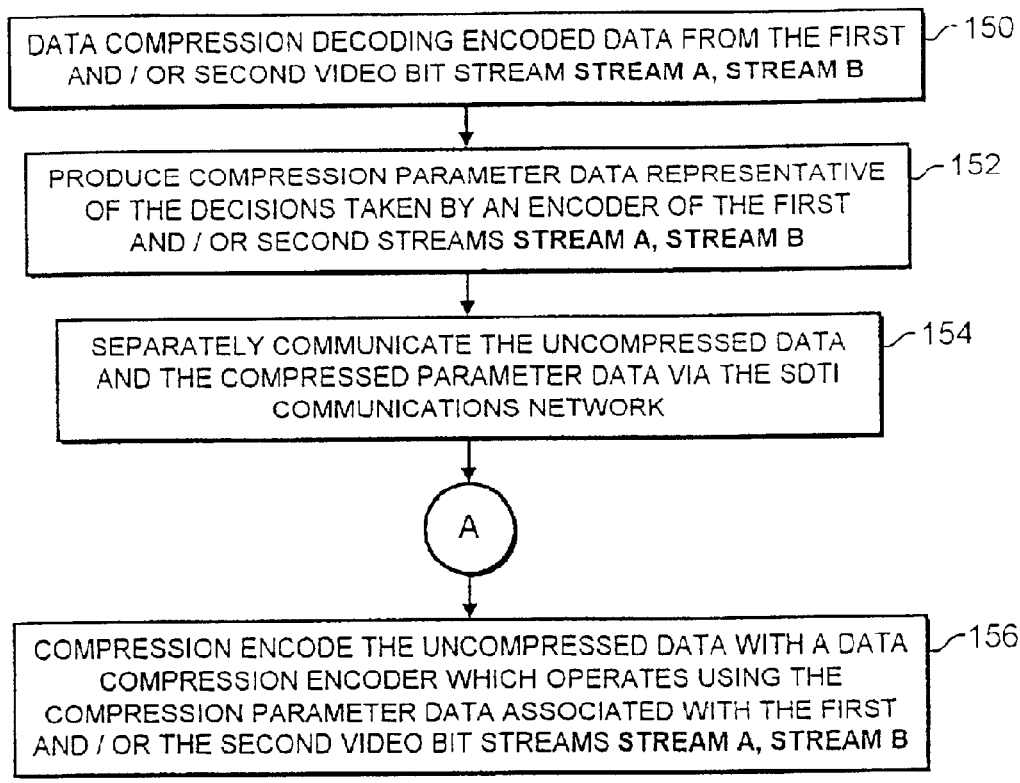
FIG. 7 is a flow diagram representing a method of processing compression encoded data, in which the compression encoded data is decoded and re-encoded using the compression parameter data of the original encoder.

The operation of the television production studio shown in FIG. 6 is illustrated by flow diagrams shown in FIGS. 7, 8, 9 and 10. The flow diagram shown FIG. 7 represents a series of steps, the operation of the television production studio to process the first and/or second compressed video data streams STREAM A, STREAM B. The method step 150 shown in FIG. 7 represents the data compression decoding of the encoded data from either the first or the second or both compressed video bit streams STREAM A, STREAM B. As part of the decoding process, in the method step 152, the data compression parameter data are produced for the first and/or second bit streams STREAM A, STREAM B. In step 154 the uncompressed data and the compression parameter data are separately communicated via the SDTI communications network. At method step 156 the uncompressed data is compression encoded with the compression parameter data associate with the first and/or the second video bit streams STREAM A, STREAM B.

Figure 8:
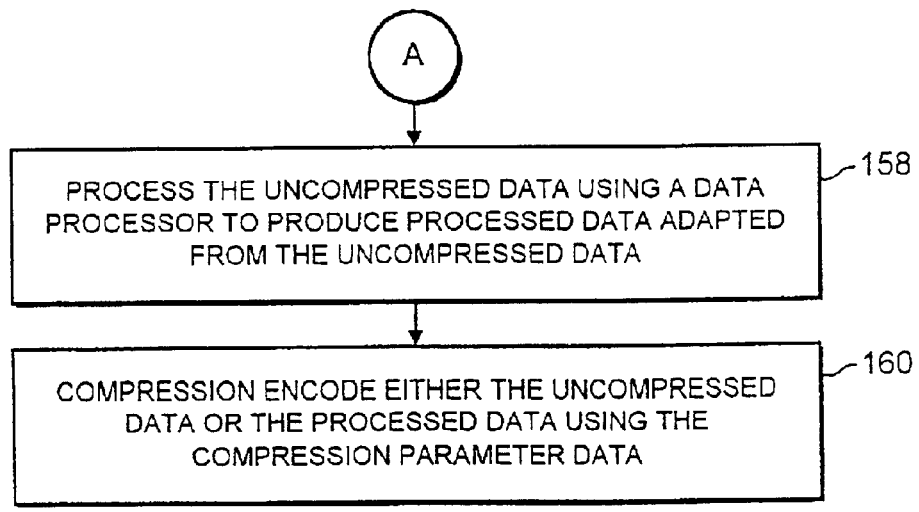
FIG. 8 is a flow diagram illustrating further steps of the method illustrated by the diagram shown in FIG. 7.

As mentioned above the uncompressed video data may be further processed by a data processor and the video switch 30, the data processor 113 and the logo insertion processor 74 are examples of such data processors. The flow diagram shown in FIG. 8 illustrates process steps which may be taken if the data processor further adapts the uncompressed data. Process step 158 represents this further processing in order to adapt the uncompressed data, and this is followed by process step 160, which would occur in place of process step 156.

Figure 9:
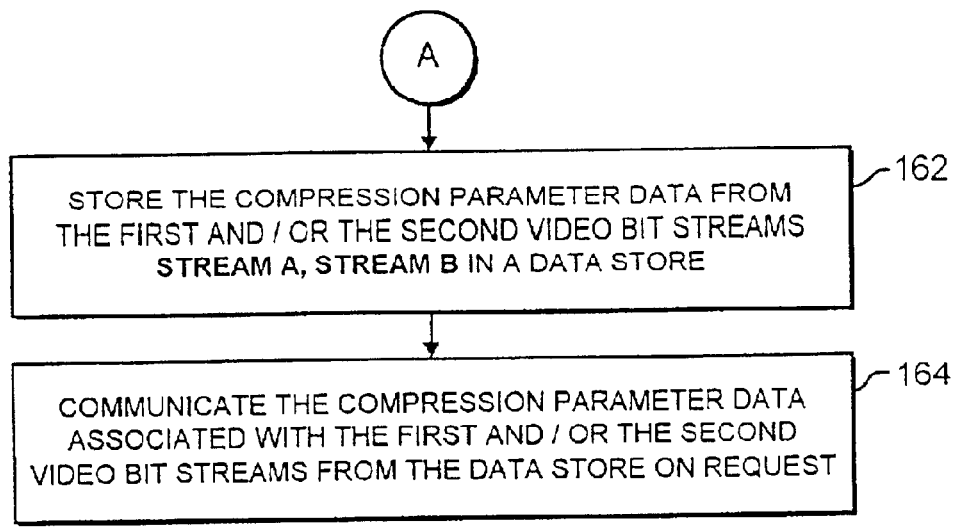
FIG. 9 is a flow diagram illustrating further steps of the method illustrated by the diagram shown in FIG. 7 or 8 in which the compression parameter data are stored in a data store.
Figure 10:
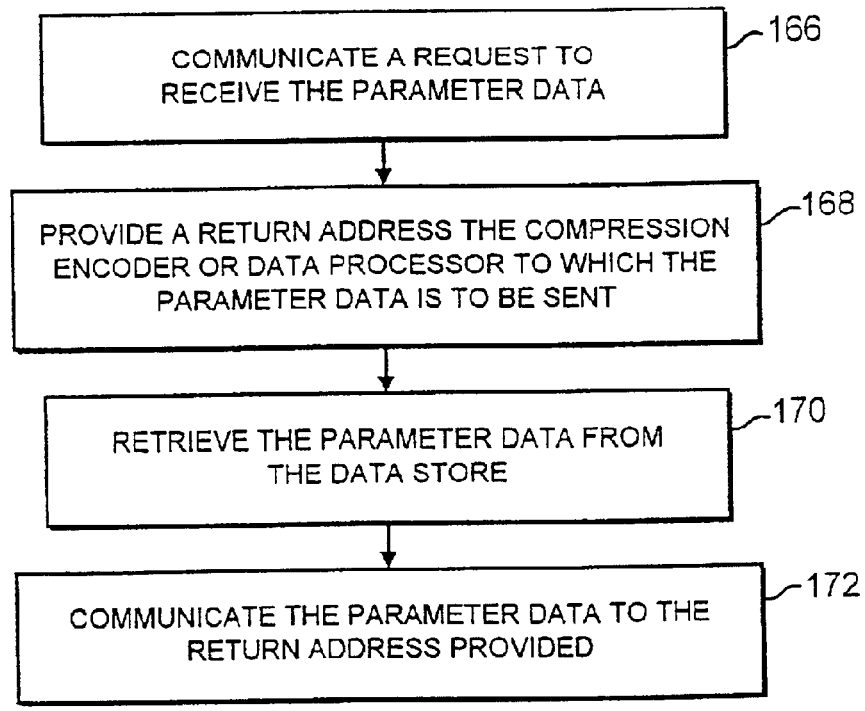
FIG. 10 is a flow diagram illustrating further process steps of the method illustrated by the diagram of FIG. 9, in which the compression parameter data are retrieved from the data store.

A further alternative at point A in the flow diagram of FIG. 7 is to store the compression parameter data in for example the data repository 116 of the example embodiment shown in FIG. 6. The flow diagram of FIG. 9, illustrates of a process in which the compression parameter data from the first and/or the second bit streams STREAM A, STREAM B are stored in a data store. Thus in method step 162 the compression parameter data are stored in the data store, and in method step 164 the compression parameter data associated with the first and/or second bit streams STREAM A, STREAM B are communicated on request. An illustration of a process in which the compression parameter data is communicated on request is shown in FIG. 10. In process step 166 of FIG. 10, a request to receive the parameter data is generated and sent to the data repository 116. The request is generated by the item of equipment attached to the SDTI communications network 110 which required the parameters such as the compression encoder 111, or the logo insertion processor 74. As represented by process step 168, the request includes providing a return address to which the parameter data is to be sent. At method step 170, the compression parameter data is retrieved from the data repository and at step 172 the parameter data is communicated to the return address provided.

Figure 11:
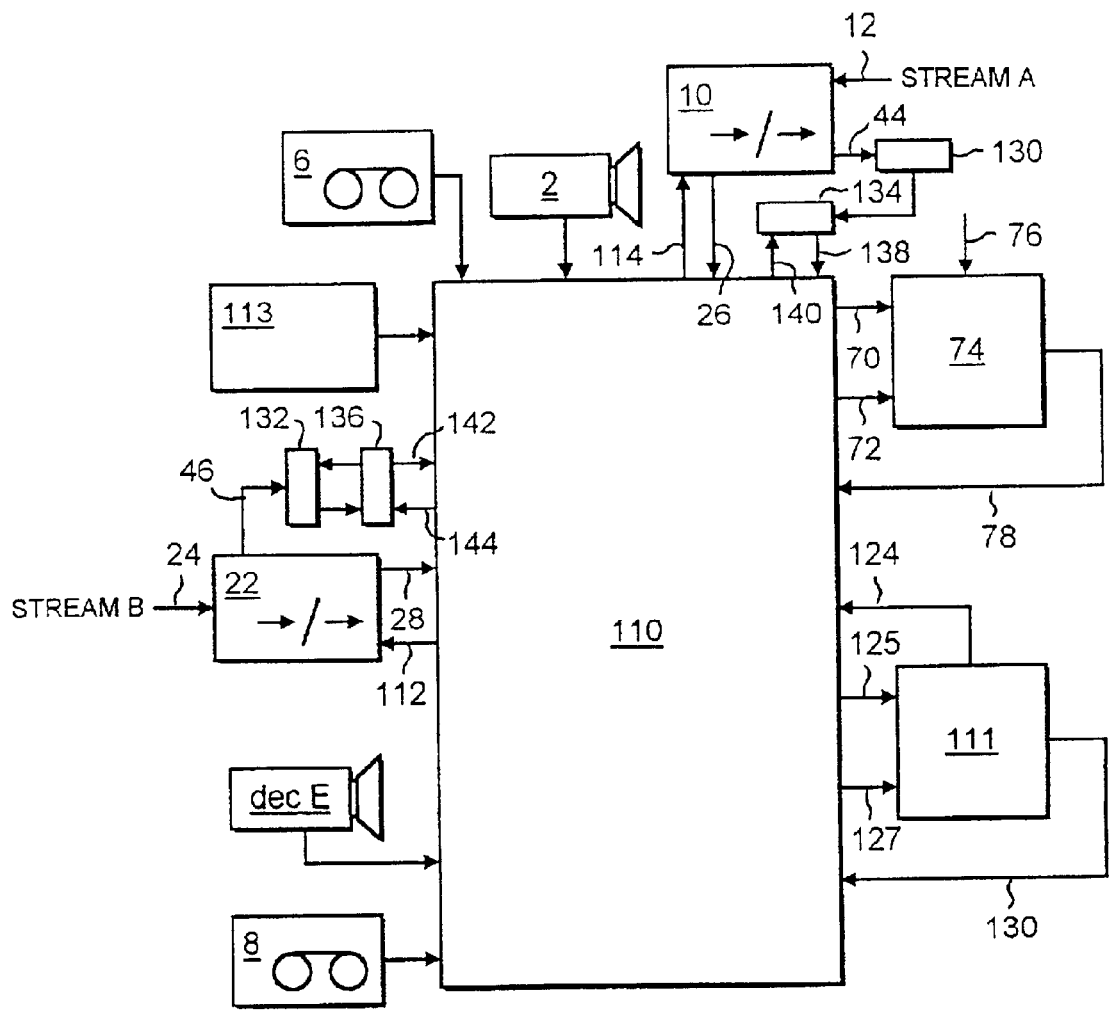
FIG. 11 is a schematic block diagram of the television production studio shown in FIG. 1, illustrating a further example embodiment of the present invention.

A further example embodiment of the present invention is shown in FIG. 11 in which a schematic block diagram of a television broadcast studio is shown. The television broadcast studio shown in FIG. 11 corresponds substantially to that shown in FIG. 6 and so only the differences between FIGS. 11 and 6 will be described. In FIG. 11, the first and second data compression decoders 10, 22 are provided with local data stores 130, 132. Unlike the embodiment of the invention shown in FIG. 6, the compression parameter data generated by the first and second data compression decoders 10, 22 are stored in the local data stores 130, 132 when they are generated by the data compression decoder. Coupled to each of the local data stores 130, 132 is a local communications processor 134, 136 which are coupled via a duplex communication channels 138, 140, 142, 144 to the SDTI communications network 110. Therefore, in operation the request for the compression parameter data generated by the data compression encoder 116 is communicated from the communications channel 24 via the SDTI communications network 110 to the local communications processors 134, 136 of the first and second data compression decoders 10, 22 respectively. In response to the retrieval message, the local communication processors 134, 136 operate to retrieve the compression parameter data from the data stores 130, 132 and to communicate the compression parameter data to respective inputs of the data compression encoder 111 via the SDTI communications network 110 by putting the return address of the input channel 125 in the header of the SDTI.

As will be appreciated, the example embodiments shown in FIGS. 6 and 11 are characterised by the features of the data stores and the local communications processors which interface with the SDTI communications network. This provides a facility through which the data compression encoder 116 can request and retrieve compression parameter data corresponding to the first and second video bit streams STREAM A, STREAM B when these are required. As will be appreciated, any other items of equipment connected to the SDTI communications network can correspondingly request compression parameter data which has been stored within the data repository 116, or local data stores 134, 136. This provides a flexibility in allowing an encoder or another data processor connected to the SDTI network to decide which compression parameter data to use when re-encoding a video signal and in particular where the video signal is composed of images from more than one video bit stream source.

As will be appreciated by those skilled in the art, although the example embodiment of the present invention has been described with reference to a television production studio and with reference to compression encoded signals produced by MPEG type encoders and decoders, the present invention finds application in any arrangement in which data compression encoding and decoding is cascaded. Furthermore although the example embodiment of the invention has been described with reference to video signals and bit streams, it will be understood that the present invention finds application with audio data, or indeed any other type of data. Example embodiments have been described with reference to television production and broadcast studios. However these are not limiting examples of the present invention which may be applied in any environment such as an editing suite.

Although the example embodiment as been described with reference to a communications network and data compression decoders and encoders, it will be appreciated that these features could be implemented as a computer program having executable instructions which when executed by an appropriately programmed data processor perform the function of these features. As such, a computer program and a computer program carrier are aspects of the present invention.

Although the preferred embodiment of the invention is a data processing system, it will be understood that the data processing system may be formed as hardware data processor such as an ASIC or the like. As such a data processing apparatus corresponding to the data processing system of the appended claims is an aspect of the present invention.

What is claimed is:

1. A data processing system, comprising
    a data compression decoder arranged in operation to decode first encoded data to produce first uncompressed data, said first uncompressed data being representative of first source data from which the first encoded data was produced in accordance with a compression encoding algorithm, said data compression decoder also producing first compression parameter data representative of decisions made by said compression encoding algorithm when said first source data was compression encoded,
    a communications processor operable
    to store said first parameter data in a data store, and
    to communicate said first uncompressed data, second uncompressed data, and said first parameter data on request via a data communications apparatus to one of a data processor or a data compression encoder, said data compression encoder being operable to compression encode a combination of said first and second uncompressed data in accordance with said compression encoding algorithm using said first parameter data, wherein said data communications apparatus is operable to communicate said first and second uncompressed data, and said first parameter data separately via a communications channel provided by said data communications apparatus.

2. A data processing system as claimed in claim 1, wherein said second uncompressed data is generated by said data compression decoder from second encoded data, said data compression decoder also producing second compression parameter data representative of decisions made by said compression encoding algorithm when said second source data was compression encoded, said communications processor being operable to store said second parameter data in said data store and to communicate said second parameter data on request to one of said data processor or said data compression encoder.

3. A data processing system as claimed in claim 1, wherein at least one of said first and second parameter data are communicated on said communications channel in a temporal period which is separate to a period when said uncompressed data is communicated.

4. A data processing system as claimed in claim 3, wherein said temporal period in which said first and second parameters data are communicated is a period of inactivity of said uncompressed data with respect to time.

5. A data processing system as claimed in claim 4, wherein said first and second uncompressed data is representative of video signals and said period of inactivity in which said first and second parameter data are communicated is a blanking period between fields of said video signals.

6. A data processing system as claimed in claim 5, wherein said blanking period between fields is formed as part of an H-Ancillary space of a Serial Digital Interface packet or Serial Data Transport Interface, said uncompressed data being communicated in the payload area of said packet.

7. A data processing system as claimed in claim 4, wherein said period of inactivity includes header information giving an address associated with one of said data processor, and said data compression decoder and said compression encoder, said communications apparatus being arranged in operation to communicate said parameter data to the associated address.

8. A data processing system as claimed in claim 7, wherein said communications apparatus has a router which operates
to identify said address from said header information,
to determine with which of said data processor, said data compression encoder, and said data compression decoder said address is associated, and
to communicate said parameter data to the associated address.

9. A data processing system as claimed in claim 1, wherein one of said data processor and said compression encoder is arranged in operation
to communicate to said communications processor a request to receive said parameter data,
to provide a return address to which said at least one of said first and second parameter data is to be sent, and said communications processor may be arranged in operation to retrieve said parameter data from said data store and to communicate using said communications apparatus said parameter data to said return address.

10. A data processing system as claimed in claim 2, wherein said data store is a local data store coupled to said data compression decoder, and said data compression decoder is arranged in operation to store said parameter data when produced in said data store, and said communications processor is arranged in operation
to receive said request for at least one of said first and second parameter data from one of said at least one data processor and said data compression encoder,
to retrieve said at least one of said first and second parameter data from said data store, and
to communicate said at least one of said first and second parameter data to one of said at least one data processor and said data compression encoder in response to said request.

11. A data processing system as claimed in claim 10, wherein said at least one data processor and said data compression encoder each have a communications processor having a pre-determined address, said communications processor being arranged in operation
to generate a retrieval message representative of said request for said at least one of said first and second parameter data, and
to communicate said retrieval message to said data compression decoder with said pre-determined address.

12. A data processing system as claimed in claim 1, wherein said data compression encoder and decoder operate in accordance with an MPEG-2 compression algorithm.

13. A data processing system as claimed in claim 12, wherein said first and second parameter data are the quantization levels, the discrete cosine transform type, vector related data and the like.

14. A data processing system as claimed in claim 2, wherein said data compression decoder comprises first and second data compression decoders operable to produce said first and second uncompressed data and said first and second parameter data by decoding first and second encoded data respectively.

15. A data system processing system as claimed in claim 2, wherein said first and said second parameter data provide the encoding decisions which were used when all of said first and second source data were compression encoded to produce said first and second compression encoded data.

16. A data processing system as claimed in claim 15, wherein said first and said second encoded data and said first and second uncompressed data are representative of first and second video images respectively, said first and said second parameter data providing the encoding decisions for all of said first and said second video images respectively.

17. A method of processing data comprising the steps of
data compression decoding first encoded data to produce first uncompressed data representative of first source data from which said first encoded data was produced in accordance with a compression encoding algorithm,
producing first parameter data representative of decisions made by said compression encoding algorithm when said first source data was compression encoded,
a storing said first parameter data in a data store,
separately communicating said first uncompressed data, second uncompressed data, and said first parameter data on request, via a communications channel, to at least one of a data processor or a compression encoder, and
compression encoding a combination of said first uncompressed data and said second uncompressed data with a data compression encoder which operates in accordance with said compression encoding algorithm using said first parameter data.

18. A method as claimed in claim 17, comprising the steps of
data compression decoding second encoded data to produce said second uncompressed data representative of second source data from which said second encoded data was produced in accordance with a compression encoding algorithm,
producing second parameter data representative of decisions made by said compression encoding algorithm when said second source data was compression encoded,
storing said second parameter data in a data store,
separately communicating said second uncompressed data, on request, via a communications channel, to at least one of a data processor or a compression encoder, wherein the step of compression encoding comprises
compression encoding said first uncompressed data and said second uncompressed data with a data compression encoder which operates in accordance with said compression encoding algorithm using said first and second parameter data.

19. A method as claimed in claim 18, comprising the steps of
processing at least one of said first and second uncompressed data using a data processor to produce processed data adapted from said at least one of said first and second uncompressed data, and compression encoding either said at least one of said first and second uncompressed data or said processed data using said first and said second parameter data.

20. A method as claimed in claim 18, wherein the step of separately communicating said first and second parameter data and said first and second uncompressed data, comprises the step of communicating said first and second parameter data on said communications channel in a temporal period which is separate to a period when said first and second uncompressed data is communicated.

21. A method as claimed in claim 20, wherein said temporal period in which said at least of said first and second parameter data are communicated is a period of inactivity of said uncompressed data with respect to time.

22. A method as claimed in claim 21, wherein the first and second uncompressed data is representative of video signals and said period of inactivity in which said first and second parameter data are communicated is a blanking period between fields of said video signals.

23. A method as claimed in claim 22, wherein said blanking period between fields is formed as part of an H-Ancillary space of a Serial Digital Interface or Serial Data Transport Interface packet, said uncompressed data being communicated in the payload area of said packet.

24. A method as claimed in claim 18, wherein the step of communicating said first and second parameter data on said communications channels comprises the steps of communicating in said period of inactivity header information giving an address associated with a destination of one of said first and second parameter data, identifying said address from said header information, determining said destination of said first and second parameter data from said address, and communicating said first and second parameter data to the associated address.

25. A method as claimed in claim 18, wherein the step of communicating said first and second parameter data on request, comprises the steps of communicating a request to receive at least one of said first and second parameter data, providing a return address to which said at least one of said first and second parameter data are to be sent, retrieving said at least one of said first and second parameter data from said data store, and communicating said at least one of said first and second parameter data to said return address.

26. A method as claimed in claim 25, wherein the step of retrieving and communicating said at least one of first and second parameter data comprises the steps of receiving said request for said at least one of said first and second parameter data from one of said at least one data processor and said data compression encoder, retrieving at least one, of said first and second parameter data from said data store, and communicating said at least one of said first and said second parameter data to said at least one data processor or said data compression encoder in response to said request.

27. A method of processing data as claimed in claim 24, wherein said data processor and said data compression encoder each have a pre-determined address, and the step of receiving said request comprises the steps of generating a retrieval message representative of said request for said at least one of said first and said second parameter data, and communicating said retrieval message to said data compression decoder with said pre-determined address.

28. A method of processing data as claimed in claim 17, wherein said data compression encoding algorithm is an MPEG-2 compression algorithm.

29. A method of processing data as claimed in claim 28, wherein the parameter data are the quantization levels, the discrete cosine transform type, vector related data and the like.

30. A method of processing data as claimed in claim 18, wherein said first and said second parameter data provide the encoding decisions which were used when all of said first and second source data were compression encoded to produce said first and second compression encoded data.

31. A method of processing data as claimed in claim 30, wherein said first and said second encoded data and said first and second uncompressed data are representative of first and second video images respectively, said first and said second parameter data providing the encoding decisions for all of said first and said second video images respectively.

32. A computer program providing computer executable instructions, which when loaded onto a computer configures the computer to operate as a data processing system as claimed in claim 1.

33. A computer program providing computer executable instructions, which when loaded on to a computer causes the computer to perform the method according to claim 17.

34. A computer program product having a computer readable medium recorded thereon information signals representative of the computer program claimed in claim 32.

* * * * *